United States Patent [19]

Zampini

[11] Patent Number: 4,488,886
[45] Date of Patent: Dec. 18, 1984

[54] AMORPHOUS ARYL SUBSTITUTED POLYARYLENE OXIDE MEMBRANES

[75] Inventor: Anthony Zampini, St. Louis, Mo.

[73] Assignee: Monsanto Company, St. Louis, Mo.

[21] Appl. No.: 509,624

[22] Filed: Jun. 30, 1982

[51] Int. Cl.$^3$ ............................................. B01D 53/22
[52] U.S. Cl. .................. 55/158; 264/209.1; 428/398
[58] Field of Search ............. 55/16, 68, 158; 210/500.2; 264/209.1, 209.6; 428/394, 395, 398

[56] References Cited

U.S. PATENT DOCUMENTS

| | | | |
|---|---|---|---|
| 3,226,361 | 12/1965 | Borman | 260/47 |
| 3,259,592 | 7/1966 | Fox et al. | 260/2.2 |
| 3,350,844 | 11/1967 | Robb | 55/16 |
| 3,432,466 | 3/1969 | Hay | 260/47 |
| 3,479,390 | 11/1969 | Blatz et al. | 260/468 |
| 3,528,858 | 9/1970 | Hodgdon et al. | 136/86 |
| 3,653,180 | 4/1972 | Juliano et al. | 55/16 |
| 3,709,774 | 1/1973 | Kimura | 55/158 X |
| 3,735,559 | 5/1973 | Salemme | 55/16 |
| 3,762,136 | 10/1973 | Kimura | 55/158 |
| 3,780,496 | 12/1973 | Ward et al. | 55/16 |
| 3,830,733 | 8/1974 | Spivack et al. | 55/16 X |
| 3,852,388 | 12/1974 | Kimura | 264/41 |
| 3,940,469 | 2/1975 | Steigelmann et al. | 264/209.1 X |
| 3,975,478 | 8/1976 | Leonard | 264/209.1 X |
| 4,008,191 | 2/1977 | Jagur-Grodzinski et al. | 260/17 R |
| 4,073,724 | 2/1978 | Chapurlat | 210/500.2 X |
| 4,073,754 | 2/1978 | Cabasso et al. | 260/17 R |
| 4,127,625 | 11/1978 | Arisaka et al. | 264/28 |
| 4,230,463 | 10/1980 | Henis et al. | 55/16 |
| 4,364,759 | 12/1982 | Brooks et al. | 55/487 |
| 4,386,944 | 6/1983 | Kimura | 55/16 |
| 4,388,189 | 6/1983 | Kawaguchi et al. | 210/500.2 X |
| 4,393,113 | 7/1983 | Sugie et al. | 210/500.2 X |

OTHER PUBLICATIONS

Hwang et al., Techniques of Chemistry, vol. VII, Membranes in Separations, Chapter 12, John Wiley & Sons, 1975.

R&D Progress Report No. 551, Plummer et al., "Development of Sulfonated Polyphenylene Oxide Membranes for Reverse Osmosis": U.S. Department of Interior, May, 1970, pp. 7-12.

*Primary Examiner*—Robert Spitzer
*Attorney, Agent, or Firm*—Henry Croskell

[57] ABSTRACT

Asymmetric polymeric gas separation membranes comprise amorphous aryl substituted arylene oxide polymer. Such amorphous polymer is capable of forming hollow fiber membranes by wet spinning procedures utilizing coagulation baths and bore injection fluids comprising water. Desirable aryl substituents include halogens, nitro, lower alkyls and lower acyls.

7 Claims, No Drawings

4,488,886

AMORPHOUS ARYL SUBSTITUTED POLYARYLENE OXIDE MEMBRANES

BACKGROUND OF THE INVENTION

This invention relates to gas separation polymeric membranes of amorphous aryl substituted polyarylene oxide and to apparatus and processes utilizing such membranes for selectively separating at least one gas from a gaseous mixture by permeation. More particularly, it relates to membranes of amorphous aryl substituted polyphenylene oxide which is capable of being formed into hollow fiber membranes by extruding a polymer solution into an aqueous coagulation bath.

The viability of the use of membranes for fluid separations as compared to other separation procedures such as absorption, adsorption, and liquefaction often depends on the cost of the apparatus and its operation including energy consumption, degree of selectivity of separation which is desired, the total pressure losses caused by the apparatus for conducting the separation procedure which can be tolerated, the useful life of such apparatus, and the size and ease of use of such apparatus. Thus, membranes are sought which provide desired selectivities of separation, fluxes and strength. Moreover, in order to be commercially attractive on an economic basis, the membranes are preferably capable of being manufactured in large quantities while achieving a reliable product quality and being readily and relatively inexpensively assembled in a permeator. Particularly advantageous membranes are anisotropic hollow fiber membranes which have a relatively thin layer (often referred to as separating layer, barrier layer, or active layer) integral with a porous structure which provides support to the separating layer and offers little, if any, resistance to the passage of fluids. In order to prepare these integral anisotropic membranes, a unitary membrane structure must be formed which possesses diametrically opposed structures. The separating layer must be formed such that it is thin and possesses few, if any, pores or other defects. On the other hand, the conditions which make the integral anisotropic membrane must also provide a support structure which is highly open such that it offers little resistance to fluid flow.

Membranes have been prepared in film and in hollow fiber form. Numerous proposals have been made pertaining to the preparation of integral anisotropic membranes in film form. In general, anisotropic film membranes are prepared by casting a solution of the polymer to form the membrane in a solvent onto a surface, e.g., a polished glass surface. The polymer may be allowed to coagulate, at least partially, in air or a gaseous or vaporous environment and then it is usually immersed into a liquid coagulant. Considerable flexibility exists in preparing anisotropic film membranes. For instance, since the polymer solution is placed on a support, the membrane precursor structure need not be self supporting at least until after coagulation is completed. Similarly, since one surface of the cast membrane is in contact with the support, each side of the membrane may be subjected to different coagulation conditions thereby permitting substantially different structures to be achieved at each surface of the membrane. Accordingly, membranes having a relatively thin layer having an essential absence of pores may be achieved at one surface of the film membrane, while the remainder of the membrane may be relatively porous. Moreover, since the film membrane precursor is supported, the coagulation conditions including coagulation times, can be widely varied to achieve the desired film membrane structure.

In some instances, however, film membranes may not be as attractive as other gas separation apparatus due to the need for film membranes to be supported to withstand operating conditions and the overall complexity of apparatus containing film membranes. Membranes in the configuration of hollow fibers may overcome some of the deficiencies of film membranes for many separation operations. The hollow fibers are generally self-supporting even under operating conditions, and can provide a greater amount of membrane surface area per unit volume of separation apparatus than that which may be provided by film membranes. Thus, separation apparatus containing hollow fibers may be attractive from the standpoint of convenience, in size and reduced complexity of design.

Many different considerations are involved in making a hollow fiber membrane than are involved in making a film membrane. For instance, no solid support, or interface, can be provided in a process for spinning a hollow fiber membrane. Moreover, in spinning procedures, the polymer solution must be of sufficient viscosity to provide a self-supporting extrudate prior to and during coagulation, and the coagulation must be quickly effected after extrusion such that the hollow fiber membrane is not adversely affected.

Processes for the formation of integral anisotropic membranes must not only meet the criteria for forming integral anisotropic hollow fiber membranes but also must be compatible with hollow fiber spinning capabilities. Hence, many constraints are placed upon the techniques available to produce integral anisotropic hollow fiber membranes. Commonly, in hollow fiber membrane spinning procedures, a solution of the polymer to form the hollow fiber membrane in a solvent is extruded through a spinnerette suitable for forming a hollow fiber structure, and a gas or liquid is maintained within the bore of the hollow fiber extrudate such that the hollow fiber configuration can be maintained. The hollow fiber extrudate must quickly be coagulated, e.g., by contact with the non-solvent for the polymer, such that the hollow fiber configuration can be maintained. The hollow fiber spinning process contains many variables which may affect the structure, or morphology, of the hollow fiber membrane such as the conditions of the polymer solution when extruded from the spinnerette, the nature of the fluid maintained in the bore of the hollow fiber membrane extrudate, the environment to which the exterior of the hollow fiber extrudate is subjected, the rapidity of coagulation of the polymer in the hollow fiber extrudate, and the like.

In order for a procedure to be attractive for the production of commercial quantities of membranes, it is also desired that the procedure be safe and economical. Thus, the solvent should not be unduly toxic, and advantageously, the solvent exhibits a very low vapor pressure to minimize risk of inhalation and/or air pollution. Moreover, a solvent having a very low vapor pressure may also minimize the risk of explosion and fire. Furthermore, waste materials from the spinning process should be able to be economically and safely discarded or recycled.

Since the solvent is only one component used in the spinning procedure, other components such as fluid within the bore of the hollow fiber extrudate, non-solvent to assist in effecting coagulation, washing fluids to remove solvent from hollow fiber membranes, and the like should also be economical and safe. Heretofore proposals have been made to use, e.g., gasoline, kerosene or other hydrocarbonaceous materials in the spinning procedure either as coagulants or to assist in drying such as disclosed by Arasaka et.al., in U.S. Pat. No. 4,127,625. Such materials clearly pose toxicity and fire risks as well as disposal problems. Moreover, in the quantities required to effect, e.g., coagulation, washing, etc., the expense of the hydrocarbonaceous materials could be a factor in the economics of the spinning process. Accordingly, it is desired to use highly safe, readily available materials, such as water or aqueous solutions, wherever possible in the spinning process, especially as non-solvent to assist in effecting coagulation and in washing to remove solvent from the hollow fiber membrane. The ability to use water, of course, will depend to a large extent upon the properties of the polymer solution with respect to water, i.e., solubility in water, heat of dilution in water, stability in water, and the like.

Polyarylene oxides have been recognized as material of some potential in the membrane separation field. For instance, Robb in U.S. Pat. No. 3,350,844 disclosed that polyarylene oxide membranes, for instance membranes of 2,6-dimethylphenylene oxide membranes, have unique properties such as a high separation factor and flux together with strength and ability to form thin films. Robb further discloses that factors such as temperature, pressure, elongation of oriented membrane material, the amount of crystallinity, among others, in the polyarylene oxide resin, may effect permeability.

In this regard polyphenylene oxide resins have a low resistance to most common organic solvents. Aromatic and chlorinated hydrocarbon solvents dissolve polyphenylene oxide polymers, while other solvents and solvent vapors induce crazing in molded polyphenylene oxide parts under stress thus causing almost complete loss of strength.

See also Kimura, U.S. Pat. Nos. 3,709,774; 3,762,136; and 3,852,388 which relate to membranes of polyxylene oxide with the same apparent disadvantages. In this regard Kimura discloses dry asymmetric membranes comprising a porous layer of interconnected crystals of a polyarylene oxide. The membranes are in the form of films cast from a polymer solution.

An alternative form of polyarylene oxide membranes is disclosed by Salemme in U.S. Pat. No. 3,735,559 where various ionic forms of a sulfonated polyxylene oxide membrane are disclosed. Among the disadvantages discussed are that it is necessary to preshrink such membranes to avoid rupturing; the hydrogen ion form is unstable and may undergo sulfone formation resulting in crosslinking or may, in the presence of water, undergo hydrolysis with the liberation of sulfuric acid; various counter ion salt forms of the membrane are stable and will avoid detrimental crosslinking but such membranes may densify in the presence of water.

Henis et.al. in U.S. Pat. No. 4,230,463 disclosed multicomponent membranes for gas separations which comprised a coating in contact with a porous separation membrane where the separation properties of the multicomponent membranes are principally determined by the porous separation membrane as opposed to the material of the coating. Henis et.al. in Examples 59–61 disclosed such multicomponent membranes where the porous separation membrane comprised brominated poly(xylene oxide) polymer where the bromination was essentially upon methyl groups. The membranes were in hollow fiber form. Such brominated poly(xylylene oxide) polymer is disadvantageous in that the polymer exhibits intrinsic permeability significantly lower than the intrinsic permeability of the precursor polymer, poly(xylylene oxide) also known as poly(2,6-dimethyl-1,4-phenylene oxide).

In summary suitable amorphous polyarylene oxide membranes have not been provided in hollow fiber form for gas separations which can exhibit sufficient flux and selectivity of separation for general commercial operations in the presence of adverse environmental conditions as the presence of chemical contaminants, extremes of differential pressure and temperature.

SUMMARY OF THE INVENTION

The present invention provides an asymmetric polymeric gas separation membrane comprised of amorphous aryl substituted arylene oxide polymers. Desirable aryl substituted arylene oxide polymers exhibit intrinsic permeabilities comparable to the precursor arylene oxide polymer. The polymer comprising the membranes of this invention is capable of mixing with a polar solvent to form a hollow fiber wet spinning solution of from 10 to 40 percent by weight of the polymer. Such wet spinning solutions are capable of forming hollow fiber membranes when extruded into a coagulation solution of at least 80 percent by weight of water.

Preferably the gas separation membrane of this invention comprises an amorphous aryl substituted polyphenylene oxide, such as aryl substituted poly(xylylene oxide), also known as poly(2,6-dimethyl-1,4-phenylene oxide). Preferred aryl substituents are located at the 3 or 5 position on poly(xylylene oxide). Such aryl substituents comprise halogens, for instance chlorine, iodine or bromine nitro groups, lower alkyl groups having less than 4 carbon atoms, and preferably lower acyl groups having from 2 to 4 carbon atoms.

The asymmetric membranes of this invention comprise amorphous polymers which are capable of being formed into hollow fiber membranes in water or aqueous coagulation solutions. Such membranes may, in addition to hollow fiber form, be in other forms such as film form.

DEFINITION OF TERMS

In the description of the present invention the following definitions are used.

The term "amorphous" as used in this application refers to a polymer material which is not crystalline, but exhibits a glass transition temperature when the polymer material is analyzed by differential scanning calorimetry.

The term "cross-linked polymer" as used in this application means that polymer chains of polyarylene oxide are bonded to one and another. The fact that the polymer is stable, that is, does not dissolve in solvents for polyarylene oxide, is indicative of cross-linking.

The term "covalently bonded" as used in this application means that the cross-linkage of polymer chains is effected by chemical bonding of atoms which share electrons. Covalent bonds may range from non-polar, involving electrons evenly shared by two atoms, to extremely polar, where the bonding electrons are very unevenly shared. Covalent bonds are not intended to mean that chemical bonding where the uneven sharing is such that the bonding electrons spend substantially full time with one of the atoms as in ionic bonding.

The term "membrane" as used in this application refers to material having surfaces which can be contacted with a fluid mixture such that one fluid of the mixture selectively permeates through the material. Such membrane can generally be disposed in film- or hollow fiber-form. Membranes can be porous, or essentially pore-free, or have layers that are porous and layers that are essentially pore-free. This invention provides membranes exhibiting advantageous gas separation properties. However the membranes of this invention will exhibit useful and advantageous liquid separation properties depending on the morphology of the membrane.

The term "dense", or "dense film", membranes as used in this application means membranes which are essentially free of pores, i.e., fluid channels communicating between surfaces of the membrane, and are essentially free of voids, i.e., regions within the thickness of the membrane which do not contain the material of the membrane. Since a dense membrane is essentially the same throughout the structure, it falls within the definition of isotropic membranes. Although some of these dense membranes are fairly selective, one of their disadvantages is low permeate flux due to the relatively large thickness associated with the membranes. Dense membranes are useful in determining intrinsic gas separation properties of a material. Intrinsic separation properties include separation factor, $\alpha$, and permeability constant, P, both of which are defined below.

The term "asymmetric" or "anisotropic" membranes are used in this application means membranes which have a variable porosity across the thickness of the membrane. Exemplary of an asymmetric membrane is what is called a Loeb membrane, which is composed of two distinct regions made of the same material—a thin dense semi-permeable skin and a less dense, void containing support region.

The membranes of this invention comprise materials in film- or hollow fiber-form which have particular relationships. Some of these relationships can conveniently be stated in terms of relative separation factors with respect to a pair of gases for the membranes which may, optionally, have coatings. A separation factor ($\alpha a/b$) for a membrane for a given pair of gases a and b is defined as the ratio of the permeability constant ($P_a$) of the membrane for a gas a to the permeability constant ($P_b$) of the membrane for gas b. A separation factor is also equal to the ratio of the permeability $(P/l)_a$ of a membrane of thickness l for a gas of a gas mixture to the permeability of the same membrane to gas b, $(P/l)_b$. The permeability for a given gas is the volume of gas at standard temperature and pressure (STP), which passes through a membrane per square centimeter of surface area, per second, for a partial pressure drop of 1 centimeter of mercury across the membrane per unit of thickness, and is expressed in units of $cm^3/cm^2$-sec-cmHg.

In practice, the separation factor with respect to a given pair of gases for a given membrane can be determined employing numerous techniques which provide sufficient information for calculation of permeability constants or permeabilities for each of the pair of gases. Several of the many techniques available for determining permeability constants, permeabilities, and separation factors is disclosed by Hwang et.al., *Techniques of Chemistry*, Volume VII, *Membranes in Separations*, John Wiley & Sons, 1975 (herein incorporated by reference) at Chapter 12, pages 296 to 322.

Unless otherwise noted, all permeabilities are reported herein at standard temperatures and pressures of 15.6° C. and 100 kPa, respectively. The intrinsic permeabilities for dense film membranes are reported in units of $10^{-10}$ $cm^3(STP)cm/cm^2$-sec-cmHg. Permeabilities of asymmetric membranes are reported in gas permeation units (GPU), which are $cm^3(STP)/cm^2$-sec-cmHg $\times 10^6$; thus 1 GPU is $1 \times 10^{-6}$ $cm^3(STP)/cm^2$-sec-cmHg.

DESCRIPTION OF A PREFERRED EMBODIMENT

The present invention provides asymmetric polymeric gas separation membranes comprised of amorphous, that is non-crystalline, aryl substituted arylene oxide polymers. Such amorphous polymer advantageously have significantly improved solution stability in hollow fiber forming solvents as compared to crystalline polymers. In this regard hollow fiber forming solutions of crystalline polymer often tends to become cloudy with time indicating polymer crystal formation, for instance by precipitation of the polymer.

Preferred aryl substituted arylene oxide polymers are aryl substituted polymers of phenylene oxide, having a sufficient degree of aryl substituents on the phenyl ring such that the polymer is amorphous. Phenylene oxide polymers, such as poly(xylylene oxide) also known as poly(2,6-dimethyl-1,4-phenylene oxide) readily crystallize from solutions. Crystalline characteristics are also exhibited when the degree of aryl substitution is low, say at levels of aryl substitution with nitro groups at about 0.01 nitro group per phenyl ring. At higher levels of aryl substitution the polymer forms stable hollow fiber forming solutions and does not exhibit crystalline properties. If the level of aryl substitution is too high, the polymer may exhibit crystalline properties or have other undesirable properties.

Aryl substituents useful in the amorphous polymers of this invention include nitro groups, halogens, alkyl groups and acyl groups. For instance aryl substituents are added to the phenyl ring of poly(xylylene oxide) at the 3 or 5 position at levels sufficient to convert the crystalline precursor poly(xylylene oxide) to an amorphous aryl substituted polymer with improved hollow fiber forming solution stability. Preferred halogen substituents are chlorine or bromine. Other halogens may be useful for some applications of amorphous polymers. Preferred alkyl substituents are lower alkyls of 1 to 4 carbon atoms. Preferred acyl substituents are lower acyl groups having 2 to 4 carbon atoms, such as acetyl, propionyl or butyryl groups.

Such amorphous polymers of arylene oxide useful in the polymeric gas separation membranes of this invention can be determined as being amorphous by any of the techniques to differentiate among crystalline and amorphous polymers. A useful technique is differential scanning calorimetry (DSC), which involves heating a sample of the polymer material at a controlled rate in a controlled atmosphere and continuously monitoring the difference in temperature or the difference in heat transfer between a reference material and the sample of polymer material due to energy changes. Glass transition temperatures are indicative of amorphous polymers. Such analysis methods are described in American Society for Testing and Materials (ASTM) Test Method D3418.

In this regard differential scanning calorimetry was conducted with poly(2,6-dimethyl-1,4-phenylene oxide). The anlysis showed an exotherm onset at 190° C. and an endotherm, indicative of melting point temperature, at 244° C. Such results are characteristic of a crystalline phase change. Amorphous acyl substituted arylene oxide polymers such as poly(2,6-dimethyl-1,4-phenylene oxide) having acetyl or propionyl substituents at the 3 or 5 position were similarly analyzed by differential scanning calorimetry and did not exhibit an exotherm or an endotherm typical of crystalline polymer melting. Rather, analysis of such acylated polymer was typical of a glass polymer. The glassy state was maintained even when poly(2,6-dimethyl-1,4-phenylene oxide) having from 0.18 to 0.36 acetyl groups per phenylene oxide unit was immersed in pentane, a treatment known to induce crystallization in poly(2,6-dimethyl-1,4-phenylene oxide).

PREPARATION OF ARYL SUBSTITUTED ARYLENE OXIDE POLYMERS

The aryl substituents can be added to the phenyl ring of arylene oxide polymers by a variety of methods, generally mild reaction conditions are preferred. The following procedures relate to the addition of aryl substituents to polymers of xylylene oxide, a preferred polymer which, when aryl substituted, is advantageously useful in the gas separation membranes of this invention.

A nitro group can be substituted onto the phenyl ring of poly(xylylene oxide) by nitration with a solution of nitric acid and chloroform at moderate temperature. Other nitration procedure is described in U.S. Pat. No. 3,226,361, incorporated herein by reference.

Poly(xylylene oxide) can be halogenated by electrophilic substitution on the phenyl ring at low temperatures, for instance lower than about 80° C., where halogenating agents include chlorine and bromine. Iodine substitution and the use of other halogenating agents may require the use of active intermediates.

Alkyl groups can be added to the phenyl ring of poly(xylylene oxide), for instance by reacting an alkyl alcohol with the polymer in the presence of a Friedel-Crafts catalyst and dessicant. In this regard a material such as trifluoromethylsulfonic acid can serve as both catalyst and dessicant.

Acyl groups can be added to the phenyl ring of poly(xylylene oxide), for instance by reacting the polymer with an acid anhydride in the presence of a Friedel-Crafts catalyst.

The aryl substituted polyarylene oxide can be recovered by precipitation in a non-solvent, for instance methanol. Other recovery steps may include filtration, washing with such non-solvent and drying, for instance at elevated temperatures and reduced pressures.

FORMATION OF DENSE FILM MEMBRANES

Dense film membranes are a useful analytical device for determining intrinsic gas separation properties of a polymeric material. For instance an amorphous aryl substituted polyarylene oxide can be dissolved in a solvent such as chloroform to produce a solution from which a dense film can be cast. Generally a solution comprising about 5 to 10 weight percent of the amorphous acyl substituted polyarylene oxide is poured on a glass plate. A casting knife is drawn over the solution to provide a uniform desired thickness. After drying in a vacuum oven a dense film can be released from the glass by immersion in deionized water. After further drying in a vacuum oven the dense film can be used to determine intrinsic gas separation membrane properties.

A sample of the dense film membrane, often a circular disc, is inserted into a test cell having a feed gas chamber and a permeate gas chamber at opposing sides of the membrane which is supported by a ring on the permeate side of the membrane. A gas mixture, for instance consisting of about 20 to 25 percent of one gas of a predominantly binary gas mixture such as of carbon dioxide and methane, is passed to the feed gas mixture side of the membrane at a flow rate of about from 2 to 10 cc/min and at a constant pressure in the range of from about 200 to 600 cmHg. Such feed gas flow rates are established at a rate substantially greater than the permeate flow rate to ensure constant feed gas composition. The permeate side of the membrane is evacuated continuously until the gas permeation reaches a steady state condition. The permeate gas flow rate is determined by allowing the permeate gas to enter an evacuated chamber while monitoring the rate of pressure increase in the evacuated chamber, for instance by using a capacitance manometer such as an MKS Baratron® CAPACITANCE MANOMETER.

A sample of the permeate gas is collected in a known volume to a pressure of about 4–5 torr and injected via a gas sample valve into a gas chromatograph to determine the permeate composition. The composition of the permeate gas in combination with the rate of pressure rise is then used to calculate intrinsic permeabilities $P_i$ of the membrane for gas species "i", which can be determined from the following equation:

$$P_i = \frac{E R \, 1 \, V}{760 \, A \, \Delta p_i} \quad (1)$$

where R is the measured rate of pressure rise in the evacuated chamber, measured in mm/sec, E is the mole fraction of species "i" in the permeate, V is the volume of the evacuated chamber into which the sample is collected, measured in $cm^3$ (STP), 1 is the membrane thickness, measured in cm, A is the membrane surface area, measured in $cm^2$, and $\Delta p_i$ is the average partial pressure differential for species "i" across the membrane film, measured in cmHg.

Membranes are determined to be at steady state when the measured values for permeability and separation factor remained constant with time.

Intrinsic separation factors, $\alpha_j^i$, are estimated from the permeate and feed gas composition by:

$$\alpha_j^i = \frac{\frac{[C_i]}{[C_a]}, \text{permeate}}{\frac{[C_i]}{[C_j]}, \text{feed gas}}$$

FORMING HOLLOW FIBER MEMBRANES

Amrophous aryl substituted polyarylene oxide can be formed into hollow fiber membranes by employing a wide variety of extrusion conditions such as fiber-forming spinning techniques which are known to those skilled in the synthetic fiber-forming industries. The fiber-forming polymer solution comprising amorphous aryl substituted polyarylene oxide material dissolved in a liquid carrier comprising a suitable solvent is prepared. In general the concentration of the polymer material in the solution is sufficient to form polymeric hollow fibers of the amorphous aryl substituted polyarylene oxide precursor material by dry and/or wet spinning techniques. The polymer concentration can vary over a wide range and depends on the characteristics desired in the final hollow fiber membrane. A maximum concentration is, of course, limited to that where the polymer solution is not amenable to extrusion through a spinnerette. Correspondingly, the lower limit is where the polymeric precursor hollow fiber does not have sufficient polymer to maintain its wall structure. In general the polymer concentrations will be from about 20 to about 70 percent by weight of the polymer solution.

The solvents used in the preparation of the polymer solution can be any number of those well known to those skilled in the art. For instance such solvents as N-formylpiperidine, N-methyl-2-pyrrolidone, etc., are particularly useful with such polymers of halogenated polyarylene oxide. Obviously the solvent selected should be a good solvent for the organic polymer and should be amenable to the dry or wet spinning techniques contemplated in the subsequent steps of the process.

Ambient or somewhat higher temperatures are usually quite adequate for the preparation of the polymer solution. Dependent on polymer and/or solvent utilized, higher or lower temperatures may aid the preparation but are not considered critical.

It is often desirable to use wet spinning techniques to provide a hollow fiber membrane having an asymmetric wall structure. It is further often desirable that such membranes having an asymmetric wall structure also have a thin dense skin. It is often preferred to produce such hollow fiber membranes by wet spinning techniques where the hollow fiber is extruded from a spinnerette and passed through a coagulating bath. Such techniques are exemplified for instance in U.S. Pat. No. 4,364,759, incorporated herein by reference.

To assist in hollow fiber membrane formation it is desirable that the liquid carrier have non-solvents added to the polymer solution. Non-solvents are generally characterized by exhibiting little capability of dissolving the polymer of the amorphous acyl substituted arylene oxide material. The non-solvent preferably exhibits little, if any, swelling action on the polymer. The non-solvent, if added in a sufficient amount, is usually capable of resulting in a phase separation in the polymer solution. Preferably, the non-solvent is not added in an amount such that the polymer solution is unduly unstable under processing conditions prior to forming the hollow fiber precursor. Frequently the amount of non-solvent in the solution is at least about 1 part by weight per 100 parts by weight of liquid carrier. Preferably, the addition of relatively small quantities of liquid coagulant to a solution of the polymer in the liquid carrier will result in phase separation or gelling of the polymer. Typical non-solvents may include acetic acid, sulfolane and the like.

It is also often desired to incorporate a stabilizer into the liquid carrier. Such stabilizers are desirable to prevent the reaction of possible impurities within the solvent from reacting with the halogenated polyarylene oxide. For instance a solvent such as N-formylpiperidine may contain impurities, such as amines or water, which could react with the active halogen of the halogenated polyarylene oxide resulting in a phase separation of gelling of the polymer. Useful stabilizers include acid anhydrides, preferably of water soluble acids, such as acetic anhydride. Generally such stabilizer can be present from 1 to 10 parts by weight per 100 parts by weight of liquid carrier.

The fiber-forming solution of amorphous aryl substituted polyarylene oxide and liquid carrier are mixed sufficiently to completely dissolve the amorphous aryl substituted polyarylene oxide. To avoid difficulties in hollow fiber spinning it is often desirable to remove entrained air from the fiber-forming solution. High temperatures and low pressures are often useful in such deaerating operations.

Hollow fiber membranes can be formed by extruding the fiber-forming solution from a spinnerette while injecting a fluid into the bore of the nascent hollow fiber at a sufficient rate to maintain the bore of the nascent hollow fiber open. The injection fluid is preferably highly miscible with the liquid carrier and often, therefore, comprises water. The nascent hollow fiber is then contacted with a liquid coagulant which is a non-solvent for the halogenated polyarylene oxide. The liquid coagulant is preferably highly miscible with the liquid carrier and the injection fluid. Usually the temperature of the liquid coagulant is sufficiently low that the polymer solution at that temperature is extremely viscous and may even be a gel. The contact of the nascent hollow fiber with the liquid coagulant is for a sufficient duration to substantially completely coagulate the polymer in the nascent hollow fiber under conditions of the liquid coagulant and thereby provide a hollow fiber. Conveniently, water is employed as the coagulating agent in the coagulating bath. Other coagulating agents may comprise ethylene glycol, polyethylene glycol, propylene glycol, methanol, ethanol and propanol, etc. The residence time for the nascent hollow fiber in the coagulating bath is at least sufficient to ensure reasonable solidification of the fiber.

The hollow fiber is then washed, that is contacted, with a non-solvent for the polymer which is miscible with the liquid carrier to reduce the content of liquid carrier in the hollow fiber. Such non-solvent for washing may conveniently comprise water. The washed hollow fiber may then be dried at a temperature which does not unduly adversely affect permeability exhibited by the hollow fiber membrane. Because water is preferably used in the bore injection fluid, the coagulation bath and wash baths, it is desirable that the amorphous aryl substituted polyarylene oxide be stable in contact with water. Accordingly aryl substituents, having an affinity for water, such as sulfono groups, will not be suitable for use in the gas separation membranes of this invention.

CROSS LINKING AMORPHOUS POLYARYLENE OXIDE MEMBRANES

Membranes of amorphous aryl substituted polyarylene oxide can optionally be cross-linked to provide improved properties such as the retention of the amorphous polymer morphology in the presence of solvents. Such cross-linking as facilitated by the presence of active halogens, for instance benzylic halogens or acyl halogens.

Cross-linking provides membranes which can exhibit improved polymer resistance to a number of detrimental effects such as swelling, brittleness, crazing, cracking, reduction of glass transition temperature, say from plasticization, and crystallization which may result from solvent absorption and evaporation.

Cross-linking of amorphous polyarylene oxide membranes having active halogen, can be effected by a wide variety of cross-linking agents which will react with an active halogen. Such cross-linking agents include water, aqueous alkaline solutions, ammonia, amines and amine solutions. Because of convenience of use one of the most preferred cross-linking agent includes ammonia, either in gaseous form or in solution form.

Cross-linking can be effected by any means of contacting the cross-linking agent with active halogen on the amorphous polyarylene oxide membrane under conditions which do not deleteriously effect the structure of the membrane. In the case of cross-linking with ammonia gas it is generally sufficient to expose the amorphous polyarylene oxide membranes to the ammonia gas, for instance in a confined space. Exposure at mild conditions, for instance ambient temperature and atmospheric pressure, are often sufficient to effect adequate cross-linking. Cross-linking can be effected to a higher degree by employing more severe reaction conditions, for instance higher pressure and/or higher temperature.

In the case of cross-linking of amorphous polyarylene oxide membranes with solutions of cross-linking agent, for instance aqueous solutions of ammonia, other amines or other organic or inorganic bases, effective cross-linking can often be obtained by simply soaking the amorphous polyarylene oxide membrane in the solution for a reasonable time. Of course more extensive cross-linking can be effected by utilizing more severe reaction conditions, for instance higher temperatures.

Hollow fiber membranes are generally preferred over film-type membranes because hollow fiber membranes are generally self-supporting even under extremes of differential pressure in operation. Hollow fiber membranes arranged in bundles can provide a very high ratio of surface area per unit volume occupied by the bundle. Hollow fiber membranes consisting of amorphous polyarylene oxide can be cross-linked prior to assembly into bundles or subsequent to assembly into bundles.

AMORPHOUS MEMBRANE COATINGS

It is generally desirable that anisotropic membranes, including those in hollow fiber form, have as thin a dense skin as possible so that the membrane exhibit high permeabilities. In fabricating membranes with such thin skin it is often difficult to avoid pores in the skin which are adverse to the separation properties, as exhibited by separation factor, $\alpha$. As disclosed in U.S. Pat. No. 4,230,463 such porous separation membrane can be advantageously utilized by providing a coating in occluding contact with the porous separation membrane.

Coatings can be optionally utilized to advantage with amorphous polyarylene oxide membranes of this invention which are in anisotropic form with a thin dense skin which is porous. Useful coatings include silicone material such as polydimethylsiloxane, which can optionally be cross-linked by the use of a coupling agent to the amorphous membrane surface.

AMORPHOUS POLYARYLENE OXIDE MEMBRANE APPLICATIONS

Such amorphous polyarylene oxide membranes of this invention are useful for a variety of uses where it is desired to provide membranes in hollow fiber form which have high separation factor flux together with high strength. This is especially desirable in membrane separation applications, for instance such as ultrafiltration, reverse osmosis, pervaporation and gas separations.

The amorphous aryl substituted polyarylene oxide membranes of this invention are particularly useful for gas separation applications. The selection of a gas separation is generally limited only by the operating environment anticipated for the membrane and the separation factor obtainable. A useful application for the membranes of this invention is the membrane gas separation of hydrogen from gas mixtures. It is often desirable to remove hydrogen from gas streams containing a variety of potentially adverse chemical species. For instance, it is often desirable to recover hydrogen from purge gas streams, for instance from ammonia production processes or refinery processes. Such purge gas streams can contain chemical species such as ammonia or hydrocarbons such as aliphatic or aromatic hydrocarbons which can be deleterious to polymers heretofore used in membrane gas separation applications.

The amorphous polyarylene oxide membranes of this invention can also be advantageously used for the separation of solvent-type gases from gas streams. Such solvent-type gases may include carbon dioxide, hydrogen sulfide, water, ammonia and the like. At relatively low levels such gases can adversely affect polymeric membranes by causing swelling or plasticization resulting in degradation of the membrane structure. When cross-linked the amorphous membranes of this invention are substantially more resistant to the adverse effects of such solvent-type gases. Accordingly the membranes of this invention can be advantageously used in separating gases such as carbon dioxide and/or hydrogen sulfide from hydrocarbon gas streams containing methane and the like.

The invention is further illustrated by, but not limited to, the following examples.

EXAMPLE 1

This example illustrates a procedure for nitration of a crystalline polyarylene oxide. 50 grams of polyxylylene oxide was dissolved in 500 ml of chloroform. The solution was mechanically stirred and cooled in an ice water bath to 5° C. 19 grams of 70 percent by weight nitric acid was added to the solution drop wise over a period of five minutes. The solution was stirred for 25 minutes while maintaining temperatures in the range of 3° to 5° C. Aryl nitrated polyxylylene oxide was precipitated in 2 liters of methanol. The polymer was collected and air dried on a filter. The yield was 45 grams of aryl nitrated polyxylylene oxide which contained 0.6 to percent by weight of nitrogen. The nitrated polymer had 0.05 nitro groups per phenyl unit.

The aryl nitrated polyxylylene oxide was soluble in n-formylpiperidine, for instance a solution of 25 percent by weight of the polymer was stable at 23° C.

Dense film membranes were cast from a solution of the polymer in chloroform to determine intrinsic permeation properties. The aryl nitrated polymer exhibited a permeability for hydrogen of $109 \times 10^{-10}$ ccm(STP)/cm$^2$-sec-cmHg; the polymer exhibited a separation factor, $\alpha H_2/CH_4$, of 27.

EXAMPLE 2

This example illustrates the aryl alkylation of a crystalline polyarylene oxide. 5 grams of polyxylylene oxide was dissolved in 100 ml of 1,2-dichloroethane. 2.5 grams of 2-proponol was added to the polymer solution. The solution was heated to 80° C. While stirring the solution 8 grams of a catalyst, trifluoromethylsulfonic acid was added to the solution which was kept in the range of 80° to 83° C. for three hours. The solution was allowed to cool for about one-half hour to about 40° C. The aryl alkylated polymer was precipitated by mixing the reaction solution in a solution containing 1000 ml of methanol and 20 ml of ammonium hydroxide. The aryl alkylated polymer was collected, washed with methanol and air dried on a filter. The yield was 4.8 grams of a polymer having 0.15 isopropyl group per phenyl unit.

The aryl alkylated polymer was analyzed by differentials scanning calorimeter. The polymer showed a glass transition temperature at about 216°. A melt temperature was not observed indicating that such aryl alkylated polyxylylene oxide is amorphous.

Dense membrane films of the aryl alkylated polyxylylene oxide were cast from a solution of the polymer in chloroform to determine intrinsic permeation properties. The polymer exhibited a permeate ability for hydrogen of about $120 \times 10^{-10}$ ccm(STP) cm/cm$^2$-sec-cmHg and a separation factor, $\alpha$ H$_2$/H$_4$ of about 26. The aryl alkylated polyxylylene oxide was soluble in n-formylpiperidine and formed stable fiber-forming solutions at 23° C.

EXAMPLE 3

This example demonstrates a general procedure for introducing bromine at both the aryl and benzylic position of a polyarylene oxide.

30 g of poly(2,6-dimethyl-1,4-phenylene oxide) having an intrinsic viscosity of 0.508 dl/g, as measured in chloroform at 25° C., was dissolved in 450 ml of chlorobenzene in a reactor consisting of a 1000 ml 3-neck round bottom flask equipped with an addition funnel, a mechanical stirrer and a condenser having an acid water trap and a thermometer. Bromine was substituted into the polymer principally at the aromatic ring (aryl bromination) by adding 42 g of bromine over 15 minutes while the solution was maintained at 66°–72° C. The aryl brominated polymer solution was heated to reflux, at a temperature of about 130° C. Under reflux, a condition favorable to benzylic bromination, 22 g of bromine was added over 30 minutes. After reflux for 10 minutes, about 20 percent of the solvent was distilled from the reaction solution. The solution was cooled and the halogenated polymer precipitated in methanol. The halogenated polymer was washed with methanol and dried at 55° C. for five days in a vacuum oven. The yield was 61.5 g (99 percent of theoretical). The halogenated polymer had a total bromine content of 49.3 percent by weight. Calculations based on nuclear magnetic resonance analysis showed that the halogenated polymer was substituted with bromine at benzylic carbon at a level of 0.88 bromine per phenylene oxide unit and substituted with bromine in the aromatic ring at a level of 0.56 bromine per phenylene oxide unit. That is, the benzylic halogen level was 0.88 and the aryl halogen level was 0.56.

EXAMPLE 4

This example illustrates a procedure for forming hollow fiber membranes of amorphous halogenated (brominated) polyarylene oxide.

Brominated polyarylene oxide was prepared from poly(2,6-dimethyl-1,4-phenylene oxide) by the two step bromination process as illustrated in Example 3. The brominated polyarylene oxide had a bromine content of 53.5 percent by weight and had a benzylic bromine level of 0.68 and an aryl bromine level of 1.02. A spinning solution was prepared and consisted of about 37 percent by weight of the brominated polymer and 63 percent by weight of a liquid carrier consisting of 88 percent by weight of N-formylpiperidine, 10 percent by weight acetic acid and 2 percent by weight acetic anhydride. The spinning solution was prepared by mixing to completely dissolve the brominated polymer. The brominated polymer solution was allowed to deaerate at room temperature.

The deaerated brominated polymer solution was heated to about 30° C. and pumped at a rate of about 8.5 cubic centimeters per minutes to a tube-in-orifice-type spinnerette having an orifice diameter of 457 microns, an injection tube outside diameter of 127 microns and an injection tube inside diameter of 76 microns. The spinnerette was maintained at a temperature of approximately 30° C. by the use of an external electrical heating jacket. Deionized water at ambient temperatures was fed to the injection tube at a rate sufficient to maintain the hollow fiber shape, about 0.6 milliliters per minute. The nascent hollow fiber was extruded at a rate of about 33.5 meters per minute through an air gap into a coagulation bath containing running tap water. The coagulation bath was maintained at a temperature of about 5° C. The nascent hollow fiber passed vertically downward into the coagulation bath for a distance of about 17 centimeters, around a roller to a slightly upwardly slanted path through the coagulation bath and then exited from the coagulation bath. The distance of immersion in the coagulation bath was about 1 meter.

The hollow fiber from the coagulation bath was then washed with running tap water in three sequential baths having Godet rolls. In each bath, the hollow fiber was immersed for a distance of about 10 to 13 meters. The first bath was maintained at a temperature of about 5° C.; the second, at 24° C.; and third, at 25° C.

The hollow fiber, while being maintained wet with water, was wound on a bobbin using a Leesona winder. The bobbin was stored in a vessel containing running tap water for about 24 hours and then stored in tap water at about ambient temperature for about 4 to 5 days. The hollow fiber, while being maintained wet, was wound on a skeiner to form hanks of hollow fibers. The hanks of hollow fiber were hung vertically and are allowed to air dry at ambient temperature. The dried hollow fiber had an outside diameter of about 355 microns and an inner diameter of about 140 microns.

A test bundle of 6 to 8 hollow fiber membranes each of about 12 centimeters in length, was prepared. At one end, the test bundle was embedded in epoxy to form a cylindrical tube sheet through which the bores of the hollow fibers communicate. The other end was plugged with epoxy.

The permeabilities and separation factors of the test bundles of hollow fiber membranes were determined using gas mixtures in an elongated cylindrical chamber of about 150 cc. The gas mixtures were fed to the chamber to contact the outer surface of the hollow fiber membranes at pressures in a range of 10 to 100 psig. The gas mixtures passed through the chamber at a flow rate in the range of one to six liters per minute. The bores of the hollow fibers were under vacuum for about 5 to 10 minutes until the permeation reached equilibrium. Permeabilities were determined by allowing permeate gas to expand into a calibrated volume over a period of time. The permeate gas samples were then subjected to analysis. The permeability, (P/l), is expressed in GPU, which is $10^{-6} cm^3(STP)/cm^2$-sec-cmHg.

The membranes exhibited a permeability for hydrogen, (P/l)H$_2$, of 184 GPU and a separation factor for hydrogen over methane, $\alpha$ H$_2$/CH$_4$, of 4.3.

The membranes were then coated. While the bores of the hollow fibers in the test bundle were subjected to a vacuum (about 0.1 to 2 millimeters of mercury absolute pressure), the test bundle was dipped in a coating solution of about 1.0 percent by weight of room temperature-curable polydimethylsiloxane in n-pentane. Two 10-second dips were sufficient to effectively coat the fibers. Bore vacuum was maintained for about 10 to 15 minutes after the test bundle was removed from the coating solution. The test bundles were dried at ambient conditions for at least one day before the permeation properties of the test bundles were determined.

The coated membranes were analyzed for permeation properties in accordance with the above-described procedure. The coated membranes exhibited a permeability for hydrogen, (P/l)H$_2$, of 100 GPU; a separation factor for hydrogen over methane, $\alpha$ H$_2$/CH$_4$, of 53; a permeability for carbon dioxide, (P/l)CO$_2$, of 42; and a separation factor for carbon dioxide over methane, $\alpha$ CO$_2$/CH$_4$, of 23.

EXAMPLE 5

This example illustrates the preparation of an amorphous polyarylene oxide which is aryl substituted with a halogenated acetyl group. The example also illustrates the formation of a membrane from such polymer and the cross-linking of the membrane.

Five grams of poly(2,6-dimethyl-1,4-phenylene oxide) having a weight average molecular weight, MW of 49,000 was dissolved in 100 ml of 1,2-dichloroethane. Some of the solvent was distilled to remove water. 7.5 grams of chloroacetic anhydride and 0.5 milliliters of trifluoromethyl sulfonic acid were added to the solution which was then heated to a boil. The solution was allowed to reflux for two hours while protected with a drying tube. After the solution was cooled to room temperature, three grams of potassium carbonate was added and the mixture stirred for 25 minutes. The solution was filtered and added to 1600 milliliters of methanol causing the chloroacetylated polyarylene oxide to precipitate. The halogenated polymer was washed with methanol and dried for three days at 50° C. in a vacuum oven. The yield was 6.1 grams (about 75 percent of the theoretical yield). The polymer was found by microelemenetal analysis to contain 67.1 percent carbon, 5.5 percent hydrogen and 11.6 percent chlorine. Calculations, based on the chlorine content, indicated the polymer contained about 0.53 chloroacetyl groups per repeating monomeric unit.

Dense film membranes of the chloroacetylated poly(2,6-dimethyl-1,4-phenylene oxide) polymer were cast from chloroform. The permeation properties for membranes of this halogenated precursor polymer were determined.

The membrane was treated with concentrated ammonium hydroxide at 60° C. for six days. The permeation properties of the ammonia cross-linked polymer were determined. The permeation properties are listed in Table I.

TABLE I

| | $P_H^2$ | $P_O^2$ | PCO$_2$ | $\alpha$H$_2$/CH$_4$ | $\alpha$O$_2$/N$_2$ | $\alpha$CO$_2$/CH$_4$ |
|---|---|---|---|---|---|---|
| Pre- | 58 | 9 | 44 | 24 | 4.7 | 21 |

TABLE I-continued

| | $P_H^2$ | $P_O^2$ | PCO$_2$ | $\alpha$H$_2$/CH$_4$ | $\alpha$O$_2$/N$_2$ | $\alpha$CO$_2$/CH$_4$ |
|---|---|---|---|---|---|---|
| cursor NH$_3$ Cross-linked | 77 | 10 | 49 | 34 | 4.7 | 26 |

Intrinsic permeabilities are in units of $10^{-10}$ cc cm/cm$^2$-sec-cm Hg.

EXAMPLE 6

This example illustrates the cross-linking of amorphous aryl halogenated polyarylene oxide hollow fiber membranes. Amorphous aryl brominated poly(2,6-dimethyl-1,4-phenylene oxide) hollow fiber membrane having 0.15 aryl bromine atoms per phenyl group and 0.57 benzylic bromine atoms per phenyl group were prepared in a manner similar to the procedure of Example 4 and cross-linked by reaction with anhydrous ammonia gas.

The hollow fiber membranes were collected into a test bundle. One end of the bundle was embedded in epoxy to form a tube sheet. The hollow fiber membranes were not coated. The test bundle was sealed in a 300 cc steel cylinder such that the bores of the hollow fibers were open to the atmosphere.

Anhydrous ammonia gas was fed into the cylinder at a rate sufficient to maintain a pressure slightly higher than atmospheric inside the cylinder. The membranes were exposed to ammonia gas at ambient temperature for 24 hours. Permeabilities and separation factors were determined; these permeation properties of the membrane exposed to ammonia gas are listed in Table II.

The hollow fiber membranes were soaked in deionized water for 20 hours at 23° C. The membranes were then dried under nitrogen at 23° C. Permeabilities and separation factors were determined; these permeation properties of the washed and dried membrane are listed in Table II.

The hollow fiber membranes were then coated with polydimethylsiloxane as in Example 4. Permeabilities and separation factors were determined; these permeation properties of the coated membrane are listed in Table II.

TABLE II

| Membrane | Permeability (GPU) | | Separation Factor | |
|---|---|---|---|---|
| | (P/l)H$_2$ | (P/l)CO$_2$ | $\alpha$ H$_2$/CH$_4$ | $\alpha$ CO$_2$/CH$_4$ |
| Brominated Hollow Fiber Membrane | 72 | 21 | 16 | 5 |
| Exposed to Ammonia Gas | 36 | 8 | 28 | 7 |
| Washed and Dried | 90 | — | 28 | — |
| Coated | 83 | 21 | 74 | 27 |

EXAMPLE 7

This example illustrates the preparation of amorphous acylated polyphenylene oxide membranes.

Poly(2,6-dimethyl-1,4-phenylene oxide) was acylated with acetic anhydride in a boiling 1,2-dichloroethane using trifluoromethyl-sulfonic acid as a Friedel-Crafts catalyst. The acylated polymer had an average of 0.12 acetyl groups per phenyl ring. The polymer had a glass transition temperature greater than 210° C. as determined by differential scanning colorimetry.

A hollow fiber spinning solution was prepared having 30 percent by weight of the acetylated polymer and 70 percent by weight of liquid carrier consisting of 91 percent by weight of N-formylpiperidine and 9 percent by weight of formamide. Four bobbins of hollow fiber membranes were prepared in a manner generally similar to that described in Example 4. The dried asymmetric hollow fiber membranes had an outer diameter of about 570 to 675 microns.

Hollow fiber membranes from each of the four bobbins, designated 4A-4D, were analyzed for permeation properties, which are listed in Table III.

TABLE III

| Hollow Fiber Membrane Bobbin No. | Permeabilities, In GPU | | |
| --- | --- | --- | --- |
|  | $(P/l)H_2$ | $(P/l)CO_2$ | $(P/l)O_2$ |
| 4A | 184 | 95 | 33 |
| 4B | 357 | 163 | 48 |
| 4C | 192 | 94 | 29 |
| 4D | 312 | 148 | 42 |
|  | $\alpha\ H_2/CH_4$ | $\alpha\ CO_2/CH_4$ | $\alpha\ O_2/N_2$ |
| 4A | 18 | 11 | 4.1 |
| 4B | 16 | 9 | 3.1 |
| 4C | 20 | 12 | 4.0 |
| 4D | 20 | 9 | 3.5 |

The foregoing description of embodiments of this invention is not intended to be a limitation to the scope of this invention. As will be apparent to those skilled in the art, many variations and modifications can be made to the compositions of this invention as described in the above embodiments without departing from the spirit and scope of this invention.

I claim:

1. A hollow fiber asymmetric polymeric gas separation membrane comprising amorphous aryl substituted arylene oxide polymer, said polymer compatible for mixing with a polar solvent to form a hollow fiber forming solution of from 10 to 40 percent by weight of polymer wherein said solution is fiber forming when extruded into a coagulation solution of at least 80 percent by weight water.

2. The membrane of claim 1 comprising the polymer wherein said solution is fiber forming when extruded with a bore injection fluid comprising at least 80 percent by weight water.

3. The membrane of claim 2 which is in hollow fiber form.

4. The membrane of claim 3 wherein the arylene oxide polymer comprises a 2,6-dialkyl-1,4-phenylene oxide polymer.

5. The membrane of claim 4 wherein the arylene oxide polymer comprises poly(xylylene oxide).

6. The membrane of claim 4 wherein the polymer has at least 0.01 aryl substituents per aryl ring, said substituents being selected from the group consisting of the halogens, nitro group, lower alkyl of 1 to 4 carbon atoms and lower acyl of 2 to 4 carbon atoms.

7. The membrane of claim 6 wherein the polymer is cross-linked.

* * * * *

UNITED STATES PATENT AND TRADEMARK OFFICE
CERTIFICATE OF CORRECTION

PATENT NO. : 4,488,886
DATED : December 18, 1984
INVENTOR(S) : Anthony Zampini

It is certified that error appears in the above—identified patent and that said Letters Patent is hereby corrected as shown below:

In Column 5, line 33, after the word "membranes", please delete the word [are] and add therefor the word --as--.
In Column 7, line 13, after the word "a", please delete the word [glass] and add therefor the word --glassy--.
In Column 7, line 65, after the word "amorphous", please delete the word [acyl] and add therefor the word --aryl--.
In Column 9, line 31, after the word "to", please delete the word [provide] and add therefor the word --produce--.
In Column 9, line 44, after the word "amorphous", please delete the word [acyl] and add therefor the word --aryl--.
In Column 9, line 68, after the word separation, please delete the word [of] and add therefor the word --or--.
In Table I, column 15, line 62, the first two headings should read $P_{H_2}$ and $P_{O_2}$, respectively.

Signed and Sealed this

Sixth Day of August 1985

[SEAL]

Attest:

DONALD J. QUIGG

Attesting Officer

Acting Commissioner of Patents and Trademarks